United States Patent
Lei

(10) Patent No.: US 12,351,225 B2
(45) Date of Patent: Jul. 8, 2025

(54) BABY TRAILER WITH CONVENIENT STORAGE

(71) Applicant: Zhongshan powerlink baby products Co., Ltd., Zhongshan (CN)

(72) Inventor: Ming Lei, Zhongshan (CN)

(73) Assignee: Zhongshan powerlink baby products Co., Ltd., Zhongshan (CN)

( * ) Notice: Subject to any disclaimer, the term of this patent is extended or adjusted under 35 U.S.C. 154(b) by 592 days.

(21) Appl. No.: 17/848,522

(22) Filed: Jun. 24, 2022

(65) Prior Publication Data
US 2023/0227086 A1    Jul. 20, 2023

(30) Foreign Application Priority Data

Jan. 18, 2022   (CN) .......................... 202220132883.1

(51) Int. Cl.
| B62B 3/00 | (2006.01) |
| B62B 3/02 | (2006.01) |
| B62B 7/06 | (2006.01) |

(52) U.S. Cl.
CPC ................ B62B 3/007 (2013.01); B62B 3/02 (2013.01); B62B 7/06 (2013.01)

(58) Field of Classification Search
CPC .......... B62B 3/007; B62B 3/02; B62B 3/025; B62B 5/082; B62B 7/06; B62B 7/08
See application file for complete search history.

(56) References Cited

U.S. PATENT DOCUMENTS

| 576,256 | A | * | 2/1897 | Clouser | .................... | B62B 3/02 |
| | | | | | | 280/640 |
| 974,678 | A | * | 11/1910 | Kremer | .................... | B62B 3/02 |
| | | | | | | 27/27 |
| 1,138,641 | A | * | 5/1915 | Dolge | ...................... | B62B 3/02 |
| | | | | | | 27/27 |
| 1,753,931 | A | * | 4/1930 | Lewis | ...................... | B62B 7/08 |
| | | | | | | 296/110 |
| 2,989,318 | A | * | 6/1961 | Schenkman | ............ | B62B 7/068 |
| | | | | | | 5/98.1 |
| 4,243,263 | A | * | 1/1981 | Thiboutot | .............. | A47C 4/286 |
| | | | | | | 297/42 |
| 4,741,552 | A | * | 5/1988 | Kassai | ...................... | B62B 7/08 |
| | | | | | | 5/154 |
| 4,746,140 | A | * | 5/1988 | Kassai | ...................... | B62B 7/08 |
| | | | | | | 108/177 |

(Continued)

Primary Examiner — Christopher B Wehrly
(74) Attorney, Agent, or Firm — JEEN IP LAW, LLC

(57) ABSTRACT

The utility model provides a baby trailer with convenient storage, which comprises a trailer frame and a storage structure. The trailer frame comprises a front side frame, a rear side frame, a rear chassis frame. The front chassis frame is hinged with the front side frame. The rear chassis frame is hinged with the rear side frame. The storage structure is hinged with the front side frame and the rear side frame, so that the front frame and the rear side frame are capable of folded. The storage structure comprises two storage frames, a connecting rod. The connecting rod is connected with the left storage frame, the connecting rod is connected with the right storage frame. The ends of the front chassis frame and the rear chassis frame are movably placed on the connecting rod. The baby trailer has the advantages of convenient storage and small occupied space after storage.

8 Claims, 5 Drawing Sheets

(56) References Cited

U.S. PATENT DOCUMENTS

| | | | | |
|---|---|---|---|---|
| 4,886,289 | A | * | 12/1989 | Yee .......................... B62B 7/08 |
| | | | | 280/47.35 |
| 5,333,893 | A | * | 8/1994 | Chen ........................ B62B 7/08 |
| | | | | 108/177 |
| 5,769,448 | A | * | 6/1998 | Wang ....................... B62B 7/08 |
| | | | | 280/658 |
| 9,327,749 | B2 | * | 5/2016 | Young ...................... B62B 5/08 |
| 9,440,668 | B1 | * | 9/2016 | Chen .................... B62B 5/0013 |
| 9,855,962 | B1 | * | 1/2018 | Chen ..................... B62B 3/025 |
| 9,950,729 | B2 | * | 4/2018 | Choi ....................... B62B 3/007 |
| 10,099,712 | B1 | * | 10/2018 | Sun ........................ B62B 5/067 |
| 10,272,937 | B2 | * | 4/2019 | Chen .................... B62B 5/0003 |
| 10,633,010 | B1 | * | 4/2020 | Zhang .................... B62B 3/025 |
| 10,836,418 | B2 | * | 11/2020 | Zhu ....................... B62B 3/025 |
| 11,225,277 | B1 | * | 1/2022 | Sun ........................ B62B 5/061 |
| 11,465,664 | B1 | * | 10/2022 | Choi ...................... B62B 3/025 |
| 2003/0062709 | A1 | * | 4/2003 | Newhard ................. B62B 7/06 |
| | | | | 280/47.38 |
| 2007/0095990 | A1 | * | 5/2007 | Park ...................... A47C 17/70 |
| | | | | 248/200 |
| 2010/0090444 | A1 | * | 4/2010 | Chen ...................... B62B 3/106 |
| | | | | 280/651 |
| 2013/0168947 | A1 | * | 7/2013 | Offord ................... B62B 7/105 |
| | | | | 280/658 |
| 2017/0190349 | A1 | * | 7/2017 | Tan ........................ B62B 7/064 |
| 2018/0201291 | A1 | * | 7/2018 | Liu ........................ B62B 7/008 |
| 2018/0297622 | A1 | * | 10/2018 | Chen .................... B62B 5/0003 |
| 2020/0031376 | A1 | * | 1/2020 | Horowitz ............... B62B 3/025 |
| 2020/0283046 | A1 | * | 9/2020 | Wu ........................ B62B 3/007 |
| 2022/0055676 | A1 | * | 2/2022 | Cui ........................ B62B 7/062 |
| 2023/0406384 | A1 | * | 12/2023 | Sun .......................... B62B 3/02 |

* cited by examiner

BABY TRAILER WITH CONVENIENT STORAGE

CROSS-REFERENCE TO RELATED APPLICATIONS

This is a U.S. patent application which claims the priority and benefit of Chinese Patent Application Number 202220132883.1, filed on Jan. 18, 2022, the disclosure of which is incorporated herein by reference in its entirety.

TECHNICAL FIELD

The present utility model belongs to the technical field of baby trailers, in particular to a baby trailer with convenient storage.

BACKGROUND

With the continuous improvement of living standards of people, a baby trailer is an essential travel tool for every family with children. When parents take their children for a trip or travel outside, children or articles for children can be put in a baby trailer for dragging or pushing, so as to achieve the purpose of saving the physical strength of parents. Because of its large size, a baby trailer is very inconvenient to store when not in use, and it takes up a lot of use area when it is placed at home. As can be seen from the above, a baby trailer which is easy to use and does not take up the use area at home has become a problem that people have been eager to solve.

Therefore, the present utility model provides a baby trailer with convenient storage.

SUMMARY

In view of the problems existing in the prior art, the present utility model provides a baby trailer with convenient storage, which has the advantages of convenient storage and small occupied space after storage, and aims to solve one of the problems existing in the prior art.

In order to achieve the above technical purpose, the present utility model uses the following technical scheme.

A baby trailer with convenient storage is provided, wherein the baby trailer comprises a trailer frame and a storage structure, the trailer frame comprises a front side frame, a rear side frame, a front chassis frame and a rear chassis frame, the front chassis frame is hinged with the front side frame, the rear chassis frame is hinged with the rear side frame, and the storage structure is hinged with the front side frame and the rear side frame, so that the front side frame and the rear side frame are capable of folded towards the middle.

According to the baby trailer with convenient storage, the storage structure comprises a left storage frame, a right storage frame and a connecting rod, one end of the connecting rod is connected with the left storage frame and the other end of the connecting rod is connected with the right storage frame, and the free ends of the front chassis frame and the rear chassis frame are movably placed on the connecting rod.

According to the baby trailer with convenient storage, the left storage frame and the right storage frame both comprise two horizontal connecting rods, two oblique first connecting rods, two oblique second connecting rods, two first hinge parts and two second hinge parts; the first hinge part is provided on the horizontal connecting rods, one end of the two horizontal connecting rods is hinged to the front side frame and the rear side frame, respectively, and the other end thereof is hinged through the second hinge parts.

According to the baby trailer with convenient storage, the first hinge part is provided with a sleeve and a limiting groove, the limiting groove is provided with a first hinge hole, the horizontal connecting rod passes through the sleeve, one end of the two oblique first connecting rods is embedded into and hinged to the limiting groove, respectively, and the other end thereof is hinged through the second hinge parts.

According to the baby trailer with convenient storage, one end of the oblique second connecting rod is hinged with the first connecting rod, and the other end thereof is hinged with the front side frame or the rear side frame.

According to the baby trailer with convenient storage, the second hinge part comprises two annular rotating parts and two cannula parts provided at one side of the rotating parts, the two rotating parts are rotatably connected by screws, and the cannula parts are inserted into and connected with the horizontal connecting rod/the oblique first connecting rod.

According to the baby trailer with convenient storage, both ends of the connecting rod are connected to the second hinge part hinged with the oblique first connecting rod, respectively.

According to the baby trailer with convenient storage, the baby trailer further comprises a dragging handle and/or a push-pull rod, wherein the dragging handle is provided on the front side frame/rear side frame, which is configured to drag the baby trailer; the push-pull rod is provided on the rear side frame/front side frame, which is configured to push and pull the baby trailer.

According to the baby trailer with convenient storage, the baby trailer is provided with four universal wheels, at least one of which is provided with a braking device.

To sum up, the present utility model uses such a structure, so that the front chassis frame is hinged with the front side frame, the rear chassis frame is hinged with the rear side frame, the storage structure is hinged with the front side frame and the rear side frame, and the front side frame and the rear side frame can be folded towards the middle. Therefore, compared with the prior art, the present utility model has the beneficial effects of convenient opening or storage when in use and small occupied space after storage, and is suitable for wide popularization and application.

The present utility model will be further explained in detail in combination with the specific embodiments hereinafter.

DETAILED DESCRIPTION

Figure 1:
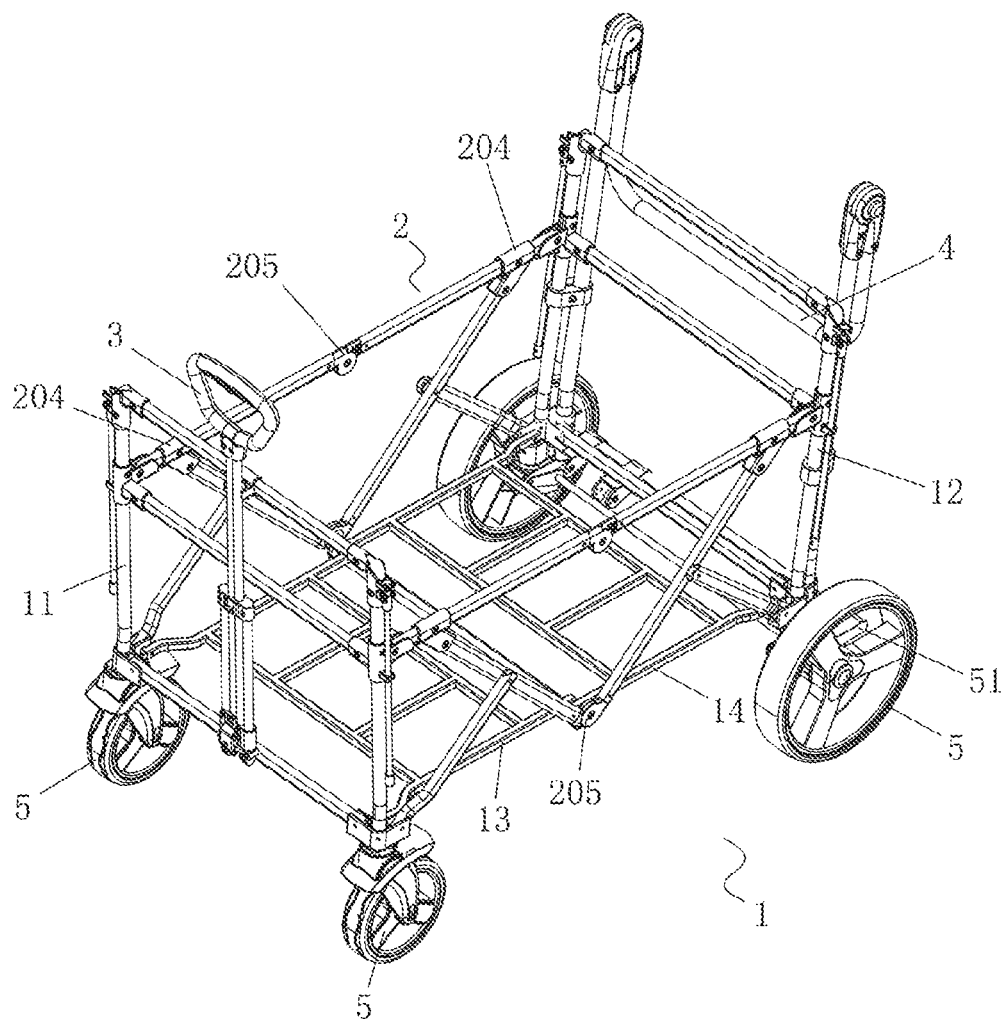
FIG. 1 is a perspective view of the present utility model.

The present utility model will be further described with reference to the attached drawings.

The embodiment of the present utility model will be described with reference to the attached drawings and specific embodiments hereinafter. Those skilled in the art can easily understand other advantages and effects of the present utility model from the contents disclosed in this specification.

It should be noted that the structure, proportion, size, etc. shown in the drawings of this specification are only used to cooperate with the contents disclosed in this specification for those skilled in the art to understand and read, rather than limit the limiting conditions implementable by the present utility model, so that they have no technical significance. Any modification in structure, change in proportion or adjustment in size should still fall within the technical contents disclosed in the present utility model without affecting the effect and purpose that the present utility model can achieve. Meanwhile, the terms such as "up", "down", "left", "right", "middle", "front", "back", "inside", "outside", "first" and "second" referenced in this specification are only for the convenience of description, rather than limit the scope implementable by the present utility model. The change or adjustment of its relative relationship should also be regarded as the implementable scope of the utility model without substantial change of technical content. The specific structure can be explained with reference to the drawings of the patent application.

Referring to FIG. 1 to FIG. 7, the present utility model discloses a baby trailer with convenient storage, comprising a trailer frame 1 and a storage structure 2. The trailer frame 1 comprises a front side frame 11, a rear side frame 12, a front chassis frame 13 and a rear chassis frame 14. One end of the front chassis frame 13 is hinged with the front side frame 11. One end of the rear chassis frame 14 is hinged with the rear side frame 12. Both ends of the storage structure 2 are hinged with the front side frame 11 and the rear side frame 12, respectively. The front side frame 11 and the rear side frame 12 are capable of folded towards the middle. It should be noted that when being folded, an acting force is applied to the middle from both sides of the front side frame 11 and the rear side frame 12. The storage structure 2, the front chassis frame 13 and the rear chassis frame 14 are correspondingly folded inward. When it is necessary to open, the front side frame 11 and the rear side frame 12 are pulled outward, and the storage structure 2, the front chassis frame 13 and the rear chassis frame 14 are correspondingly unfolded to both sides. With this structure, it is convenient to open or store, and the occupied space after storage is small.

Figure 3:
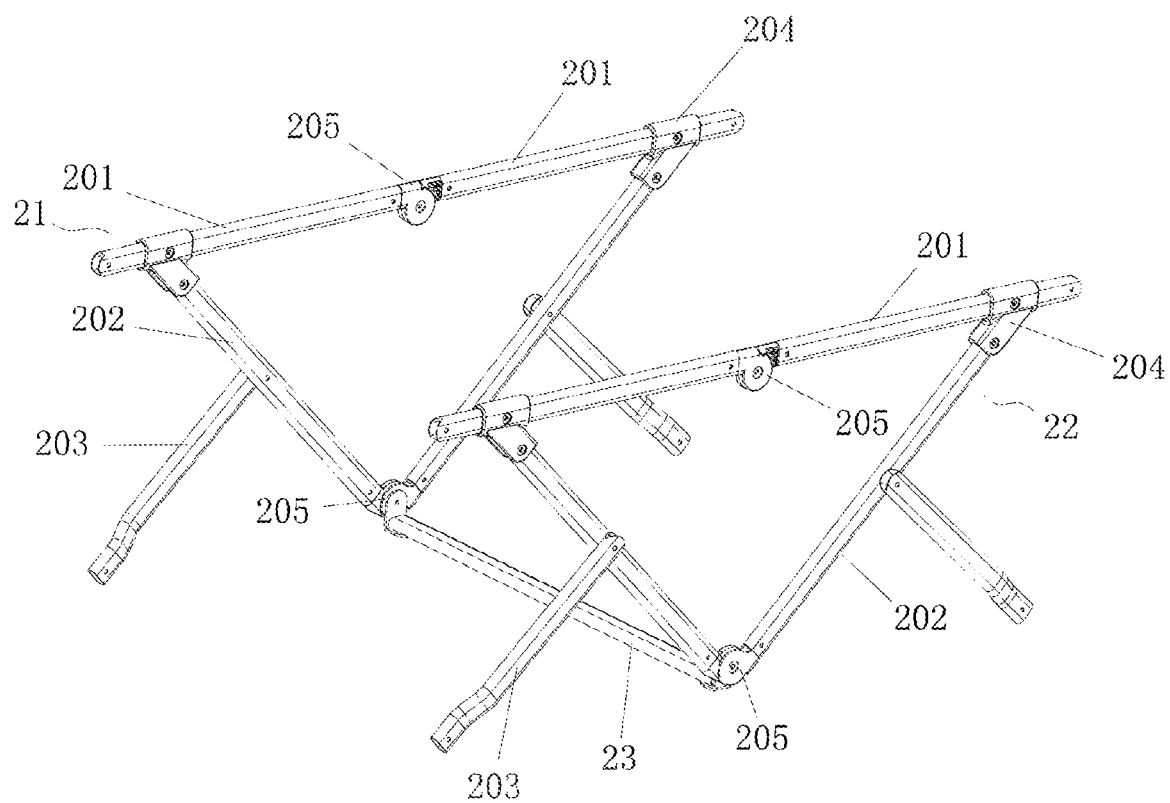
FIG. 3 is a first structural schematic diagrams of a storage structure.
Figure 4:
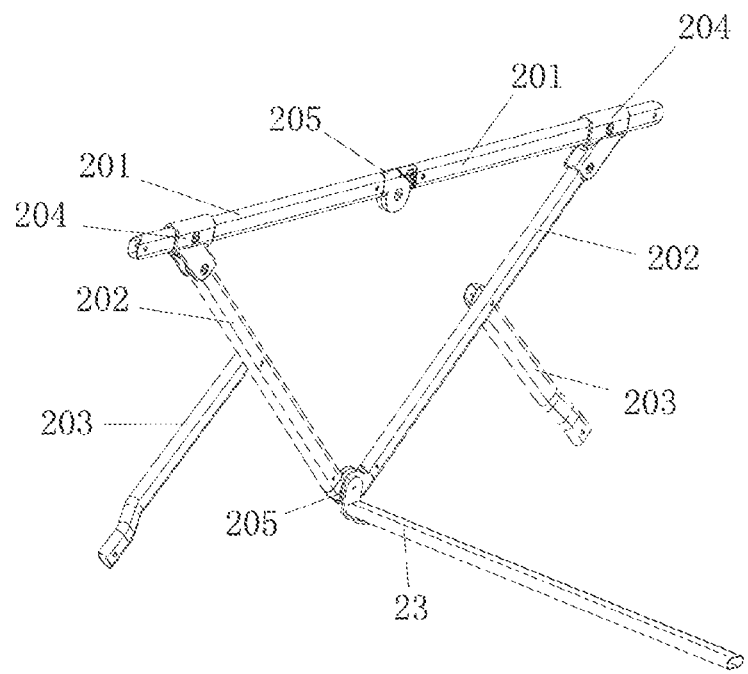
FIG. 4 is a second structural schematic diagram of a storage structure.

As a further preferred technical scheme of the present utility model, as shown in FIG. 3 and FIG. 4, the storage structure 2 comprises a left storage frame 21, a right storage frame 22 and a connecting rod 23. One end of the connecting rod 23 is connected with the left storage frame 21 and the other end of the connecting rod is connected with the right storage frame 22. The free ends of the front chassis frame 13 and the rear chassis frame 14 are movably placed on the connecting rod 23. The left storage frame 21 and the right storage frame 22 both comprise two horizontal connecting rods 201, two oblique first connecting rods 202, two oblique second connecting rods 203, two first hinge parts 204 and two second hinge parts 205. The first hinge part 204 is provided on the horizontal connecting rods 201. One end of one of the horizontal connecting rods 201 is hinged to the front side frame 11, and one end of the other horizontal connecting rod 201 is hinged to the rear side frame 12. The other end of the two horizontal connecting rods 201 is hinged through the second hinge parts 205.

Figure 5:
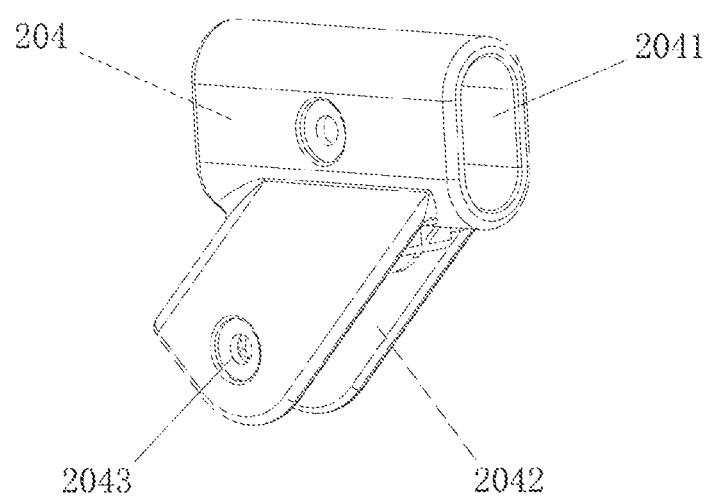
FIG. 5 is a perspective view of a first hinge part.

Further, as shown in FIG. 5, the first hinge part 204 is provided with a sleeve 2041 and a limiting groove 2042. The side wall of the limiting groove 2042 is provided with a first hinge hole 2043. The horizontal connecting rod 201 passes through the sleeve 2041 and is fixed. One end of the two oblique first connecting rods 202 is embedded into and hinged to the limiting groove 204, respectively, and the other end thereof is hinged through the second hinge parts 205.

Figure 6:
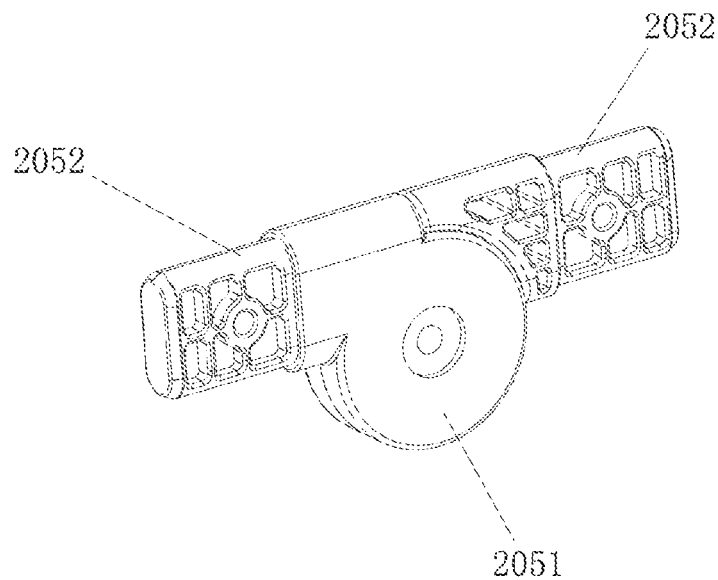
FIG. 6 is a perspective view of a second hinge part.
Figure 7:
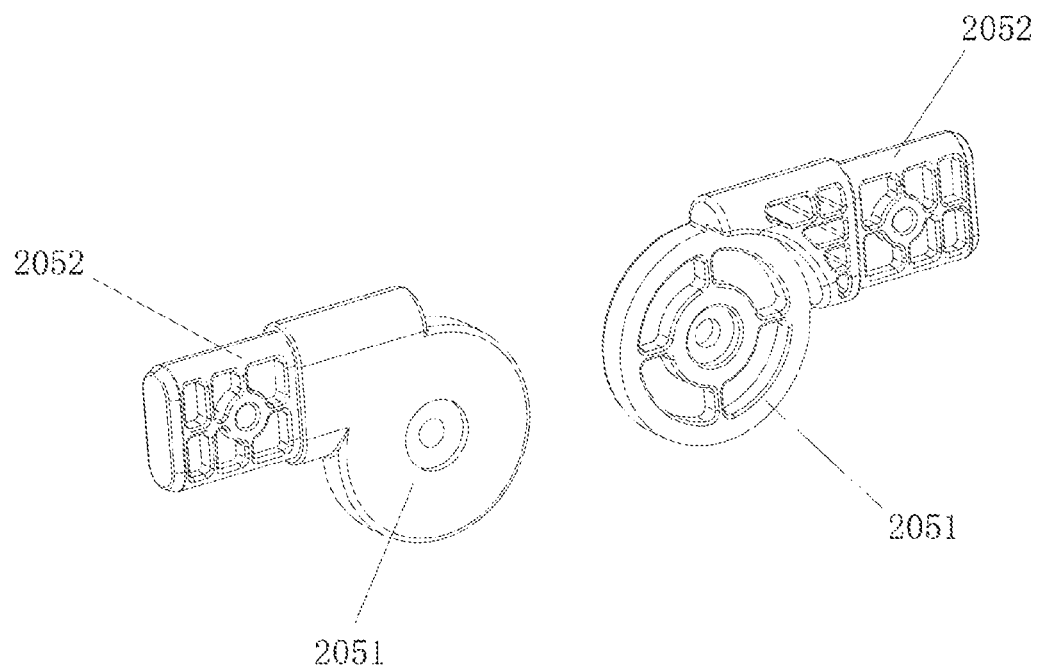
FIG. 7 is an exploded view of a second hinge part.

Further, as shown in FIGS. 6 and 7, the second hinge part 205 comprises two annular rotating parts 2051 and two cannula parts 2052 provided at one side of the rotating parts 2051. The two rotating parts 2051 are rotatably connected by screws, and the cannula parts 2052 are inserted into and connected with the horizontal connecting rod 201 or the oblique first connecting rod 202.

Further, as shown in FIGS. 1 and 3, one end of the oblique second connecting rod 203 is hinged with the first connecting rod 202, and the other end thereof is hinged with the front side frame 11 or the rear side frame 12.

When being folded, the second hinge part 205 on the horizontal connecting rod 201 rises upward. Both ends of the horizontal connecting rod 201 are folded inward with the upper ends of the first hinge part 204 and the oblique first connecting rod 202. The oblique first connecting rod 202 is folded inward to drive the upper end of the oblique second connecting rod 203 to rise upward. The free ends of the front chassis frame 13 and the rear chassis frame 14 also rise upward correspondingly, so that the front side frame 11 and the rear side frame 12 are folded toward the middle.

As a further preferred technical scheme of the present utility model, as shown in FIG. 3 and FIG. 4, both ends of the connecting rod 23 are connected to the second hinge part 205 hinged with the oblique first connecting rod 202, respectively.

Figure 2:
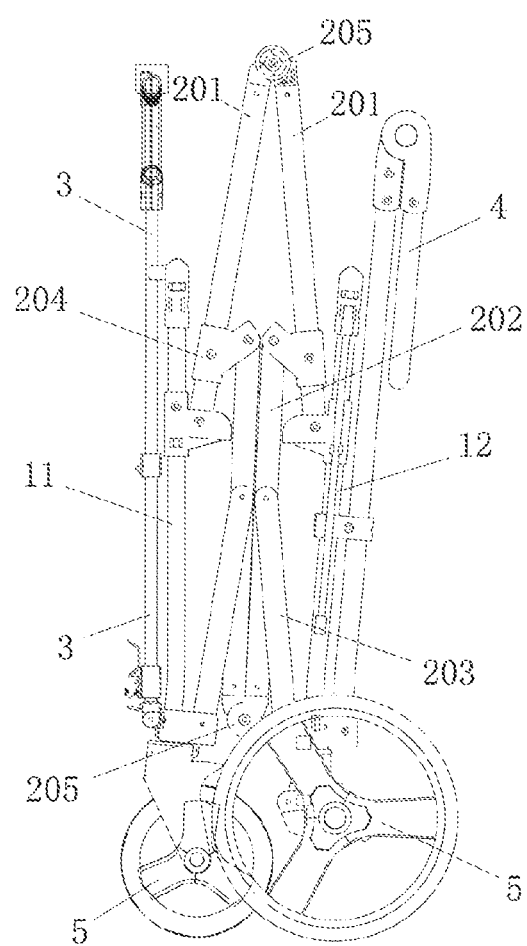
FIG. 2 is a perspective view of the present utility model in a folded state.

As a further preferred technical scheme of the present utility model, as shown in FIG. 1 and FIG. 2, the baby trailer further comprises a dragging handle 3 and/or a push-pull rod 4. The dragging handle 3 is provided on the front side frame 11 or the rear side frame 12, which is configured to drag the baby trailer.

Accordingly, the push-pull rod 4 is provided on the rear side frame 12 or the front side frame 11, which is configured to push and pull the baby trailer.

As a further preferred technical scheme of the present utility model, as shown in FIG. 1, the trailer frame 1 is provided with four universal wheels 5, at least one of which is provided with a braking device 51.

To sum up, the present utility model uses such a structure, so that the front chassis frame is hinged with the front side frame, the rear chassis frame is hinged with the rear side frame, the storage structure is hinged with the front side frame and the rear side frame, and the front side frame and the rear side frame can be folded towards the middle. Therefore, compared with the prior art, the present utility model has the beneficial effects of convenient opening or storage when in use and small occupied space after storage, and is suitable for wide popularization and application.

The above embodiments only illustrate the principle and the effect of the present utility model, rather than limit the present utility model. Those skilled in the art can modify or change the above embodiments without departing from the spirit and scope of the present utility model. Therefore, all equivalent modifications or changes made by those who have common knowledge in the technical field without departing from the spirit and technical ideas disclosed in the present utility model should still be covered by the claims of the present utility model.

What is claimed is:

1. A baby trailer with convenient storage, comprising a trailer frame and a storage structure; wherein the trailer frame comprises a front side frame, a rear side frame, a front chassis frame and a rear chassis frame, the front chassis frame is hinged with the front side frame, the rear chassis frame is hinged with the rear side frame, and the storage structure is hinged with the front side frame and the rear side frame, so that the front side frame and the rear side frame are capable of folding towards a middle of the trailer;

wherein the storage structure comprises a left storage frame, a right storage frame and a connecting rod; one end of the connecting rod is connected with the left storage frame and the other end of the connecting rod is connected with the right storage frame, and free ends of the front chassis frame and the rear chassis frame are movably placed on the connecting rod;

wherein the left storage frame and the right storage frame both comprise two horizontal connecting rods, two oblique first connecting rods, two oblique second connecting rods, two first hinge parts and two second hinge parts; the first hinge part is provided on the horizontal connecting rods, one end of the two horizontal connecting rods is hinged to the front side frame and the rear side frame, respectively, and the other end thereof is hinged through the second hinge parts.

2. The baby trailer with convenient storage according to claim 1, wherein:

the first hinge part is provided with a sleeve and a limiting groove, the limiting groove is provided with a first hinge hole, the horizontal connecting rod passes through the sleeve, one end of the two oblique first connecting rods is embedded into and hinged to the limiting groove, respectively, and the other end thereof is hinged through the second hinge parts.

3. The baby trailer with convenient storage according to claim 2, wherein:

one end of the oblique second connecting rod is hinged with the first connecting rod, and the other end thereof is hinged with the front side frame or the rear side frame.

4. The baby trailer with convenient storage according to claim 2, wherein:

the second hinge part comprises two annular rotating parts and two cannula parts provided at one side of the rotating parts, the two rotating parts are rotatably connected by screws, and the cannula parts are inserted into and connected with the horizontal connecting rod or the oblique first connecting rod.

5. The baby trailer with convenient storage according to claim 2, wherein:

both ends of the connecting rod are connected to the second hinge part hinged with the oblique first connecting rod, respectively.

6. The baby trailer with convenient storage according to claim 1, further comprising a dragging handle and a push-pull rod;

wherein the dragging handle is provided on the front side frame or the rear side frame, which is configured to drag the baby trailer;

the push-pull rod is provided on the rear side frame for the front side frame, which is configured to push and pull the baby trailer.

7. The baby trailer with convenient storage according to claim 1, wherein:

the baby trailer is provided with four universal wheels, at least one of which is provided with a braking device.

8. The baby trailer with convenient storage according to claim 1, further comprising a dragging handle or a push-pull rod;

wherein the dragging handle is provided on the front side frame or the rear side frame, which is configured to drag the baby trailer;

the push-pull rod is provided on the rear side frame or the front side frame, which is configured to push and pull the baby trailer.

* * * * *